July 4, 1972

J. I. MERGY 3,674,626

THERMO-FORMABLE PLASTIC MATERIAL FOR MAKING
SEMI-RIGID PLASTIC PACKAGES

Filed July 24, 1969

Inventor
James I. Mergy
By Mann, Brown, McWilliams & Bradway
Attys.

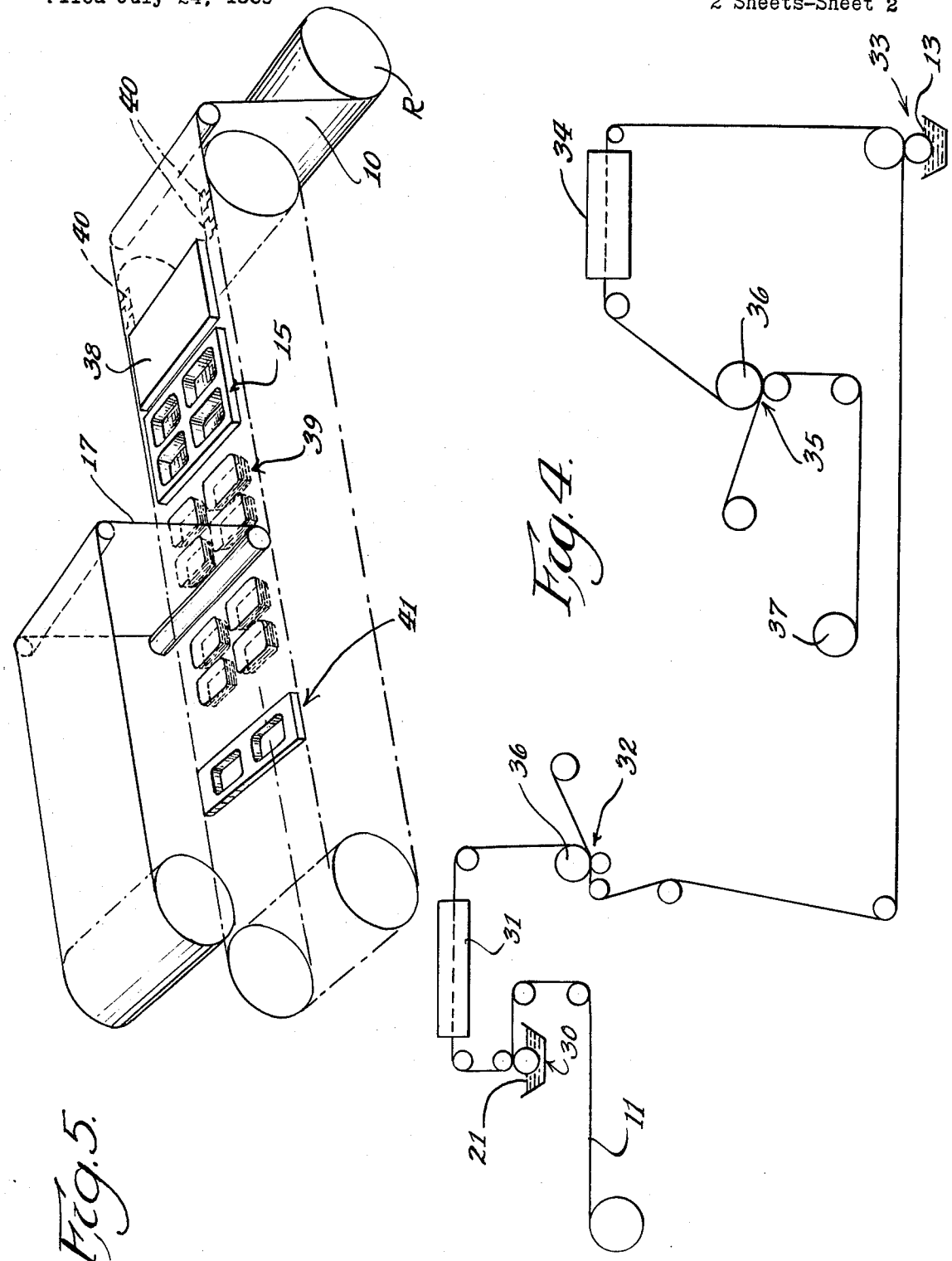

United States Patent Office 3,674,626
Patented July 4, 1972

3,674,626
THERMO-FORMABLE PLASTIC MATERIAL FOR MAKING SEMI-RIGID PLASTIC PACKAGES
James I. Mergy, New London, Wis., assignor to Curwood, Inc.
Filed July 24, 1969, Ser. No. 844,572
Int. Cl. B32b 7/02, 27/30
U.S. Cl. 161—165      6 Claims

ABSTRACT OF THE DISCLOSURE

A novel thermo-formable plastic material characterized by its ability to take shallow or deep draws and be substantially wrinkle free after being subjected to heat for the forming process, the material being a laminate of rigid plastic material with an oriented thermo-plastic material adhered thereto, whereby the shrink energy of the latter material is used to prevent wrinkle formation during the heating of the laminate preliminary to forming, and whereby after a product has been placed in the cup-shaped depression formed by the draw, a cover sheet may be sealed to the flanges thereof to produce a hermetically sealed package free of weak spots normally caused by wrinkling or buckling of the sheet. The invention also includes a novel method for making such packages.

BACKGROUND OF INVENTION

Although this invention pertains primarily to what is known as semi-rigid packaging and deals with the problem of buckling of the sheet that is used to form the cup-shaped depression of the rigid portion of the package, the invention in its broadest aspect has applicability wherever there is a problem in the drawing of plastic materials due to buckling or wrinkling during the thermoforming of the material.

In making semi-rigid plastic packages on machines of the type exemplified by Lovas et al. Pat. 3,303,628, it has been customary to use for the base material a rigid vinyl that is preheated prior to being subjected to the thermoforming draw operation. Usually, the rigid vinyl material has been preliminarily laminated with a suitable heat sealable material such as Saran-coated polyethylene, but other types of laminates have been used.

It has been observed that during the preliminary heating step there is a tendency for the vinyl material to buckle or wrinkle as it is advanced to the vacuum forming position on the machine, and the result has been that the formed material oftentimes has incorporated in it some of the wrinkles and buckling that were present prior to the vacuum forming of the piece. As a result, after a product has been inserted into the cup-shaped depressions formed in this manner, and an attempt is made to heat-seal a flexible cover to the base sheet to complete the package, the marginal flange area around the depressions containing the product is other than completely planar, with the result that imperfect seals are often obtained, and since the packages are normally evacuated prior to sealing and may or may not contain a gas fill, leakages have occurred that severely limit the shelf-life of the products, particularly when it is a food product.

Various attempts have been made to overcome this problem, as for example by annealing the rigid vinyl material prior to its use in the packaging machine, and other substitute materials have been tried in an effort to find one that would not present this problem, but such other materials have been found either to be impractical from a cost standpoint and are therefore not acceptable to the industry, or they have physical properties that are not particularly suited to the semi-rigid packaging of food products and the like.

SUMMARY OF INVENTION

The present invention solves the problem in a unique manner by laminating to the rigid vinyl material a biaxially oriented thermo-formable material which has a shrink temperature which is substantially equal to or less than the thermoforming temperature of the rigid vinyl, and it has been observed that when this is done the shrink tension of the biaxially oriented material prevents the rigid vinyl material from buckling or wrinkling under the heating operation involved in the forming of the depressions in the vinyl material. The biaxially oriented material is suitably bonded to the rigid vinyl material so that it may function in this manner.

The principal objects of the invention therefore include the following: To provide a commercially feasible method of overcoming the buckling problem inherent in the use of rigid vinyl or like materials in form and fill packaging machinery and like applications; to provide an improved method of making semi-rigid packaging using rigid vinyl as the base material for the formed sheet; and to make hermetically sealed semi-rigid packages which are more reliable in maintaining their hermetic seal.

These and other objects of the invention will become apparent as the disclosure proceeds and the description is read in conjunction with the accompanying drawings in which:

FIG. 4 is a diagrammatic drawing showing one way in which the improved laminate structure used for the rigid sheet may be made; and FIG. 5 illustrates in a diagrammatic manner the successive operations that are performed in a conventional semi-rigid packaging machine of the type generally shown in Lovas et al. Pat. 3,303,628.

SPECIFIC DESCRIPTION OF INVENTION AND PREFERRED EMBODIMENTS

It should be understood that this invention has applicability in any situation in which a plastic sheet that is to be thermo-formed, has a tendency to buckle or wrinkle in the thermoforming process, but for purposes of disclosure it will be described with reference to the making of semi-rigid packaging in machines of the type exemplified by the Lovas et al. patent previously identified.

The rigid vinyl material commonly used in semi-rigid packaging machines is chosen so that it forms at temperatures something less than about 300 degrees F. At these temperatures, buckling frequently occurs. I have found that if I laminate to the rigid vinyl material a biaxially oriented thermo-plastic material that has a shrink temperature that is substantially equal to or less than the thermoforming temperature of the rigid vinyl, the stretch energy of the biaxially oriented sheet actually serves to prevent buckling and wrinkling of the rigid vinyl material, provided the biaxially oriented sheet is appropriately bonded to the vinyl material. By shrink temperature I mean the temperature at which the biaxially oriented thermoformable material begins to release, in any substantial way, the stretch energy that is present in the sheet due to the biaxial orientation and as long as this process is carried on while the rigid vinyl is reaching its thermoforming temperature, the objectionable buckling and wrinkling is avoided.

Although I prefer to use as the control laminate material a biaxially oriented, not heat set, vinyl material, I have found that biaxially oriented, not heat set, polystyrene, polyester and polypropolene may be used for this purpose. Although biaxially oriented materials that are not heat set are known to have available shrink energy, any other not heat set material which may be satisfactorily bonded to rigid vinyl and have shrink energies adequate for the purpose and shrink temperatures substantially equal to or less than the thermoforming temperature of the vinyl may be used.

Figure 1:
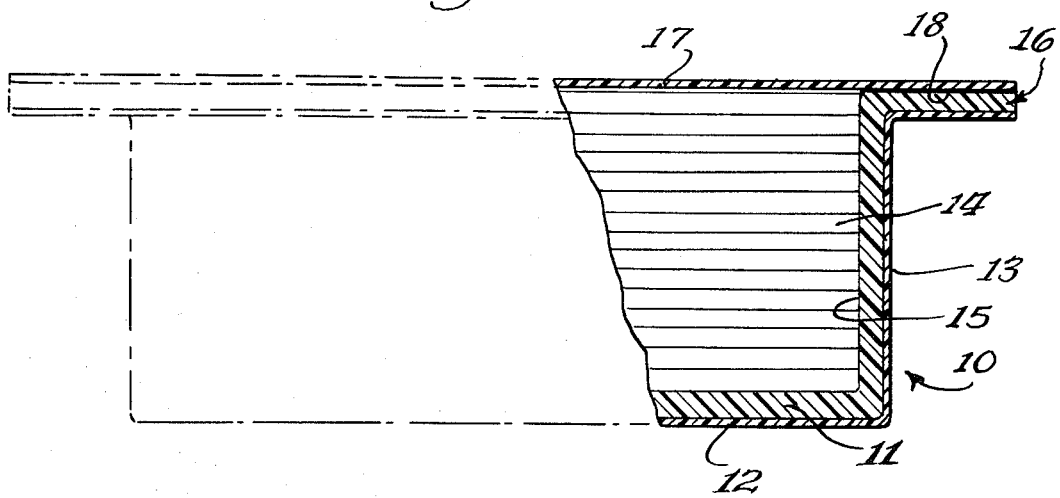
FIG. 1 is a vertical cross-sectional view showing a semi-rigid package made in accordance with this invention.

Referring now to the drawings, it will be seen that in FIG. 1 there is shown a semi-rigid package made in accordance with this invention. The package is made in two parts, the lower part or sheet generally designated 10 being a sheet formed of a calendered rigid vinyl material 11 to which a biaxially oriented plastic material 12 has been bonded as indicated by the bond line 13. A product 14 is shown diagrammatically within the cup-shaped depression 15 formed in the lower sheet 10 and this depression is flanked by a planar flange portion generally indicated at 16 to which a flexible thermo-plastic cover material 17 is hermetically sealed, as indicated by the bond line 18.

Figure 2:
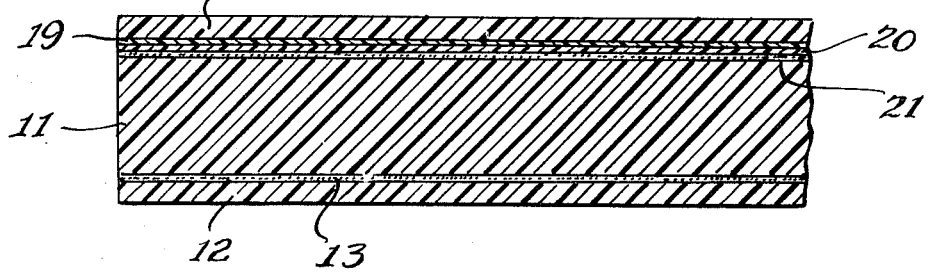
FIG. 2 is an enlarged sectional view through the formed rigid sheet showing a preferred laminate construction for this sheet.

A preferred material used for the lower portion of the semi-rigid package is shown in FIG. 2 and as there shown, the thermo-formable material 10 comprises the rigid vinyl layer 11 (Tenneco Chemicals, Inc. Mirrex calendered unplasticized polyvinyl chloride MCFD–1025 Clear) preferably on the order of from 6 to 12 mils or greater in thickness, a shrink vinyl 12, which in this instance, is a biaxially oriented, not heat set, vinyl material of approximately one mil in thickness (Dayco Corp. Cadco Div. S–401 shrink vinyl film), a soft tacky adhesive 13 which in this instance is a synthetic thermoplastic rubber-resin type (polyvinyl acetate copolymer base) adhesive applied from a solvent system, such as National Starch and Chemical Corporation adhesive Resyn 30.9061, and on the other side of the rigid vinyl sheet is a polyethylene or polyethylene copolymer film 18 of approximately 2 mils thickness, which is bonded through use of a primer as indicated at 19 to a polyvinylidene chloride copolymer such as saran of approximately .1 mil thickness, as indicated at 20, and this latter layer 20 is adhered to the rigid vinyl sheet by means of a curing type adhesive 21 such as polyurethane adhesives as for example Monton Chemical Co. Adcote 503 adhesive.

When the lower sheet or formed sheet 10 is laminated as described above, it is appropriate to use as the flexible cover material 17 (see FIG. 3), in the order named, a two-mil polyethylene film adhered by a two-part curable polyurethane adhesive 23 to a polyester film 24 of approximately ½ mil thickness, the polyester film preferably being Mylar and being coated on its underside with a ¹⁄₁₀ mil thickness of polyvinylidene chloride copolymer 25 such as saran.

In making the formed rigid sheet 10 of FIG. 2, I first take the rigid vinyl sheet 11 (see FIG. 4) and then have applied to it the curable adhesive 21 by conventional applicator 30. The web is then passed through a drying apparatus 31 where the solvent is removed from the adhesive and the saran-coated polyethylene is then applied as a first lamination, as indicated at 32. The web then passes through a tacky adhesive applicator 33 for the application of the soft tacky adhesive 13 to the underside of the rigid vinyl sheet 11 and the web then passes through a drier 34 to remove the solvent and this adhesive and the web then passes to the second laminator 35 where the shrink vinyl layer 12 is applied to the underside of the rigid vinyl sheet. In each laminating operation at 32 and at 35, a hot roll 36 is employed operating at a temperature of approximately 180 degrees F. in order to activate the adhesive for the laminating operation. After passing through the second laminator the composite web is rolled upon a roll 37 and it is this roll that is used at the position R shown in FIG. 5 in making up the semi-rigid package.

Figure 3:
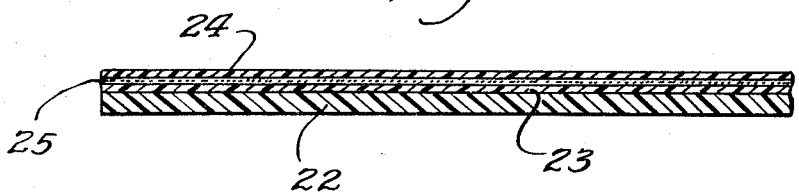
FIG. 3 is an enlarged sectional view through the flexible top sheet showing a preferred laminate structure for this sheet.

The fabrication of the top sheet 17 with components as shown in FIG. 3 is done in a conventional manner and need not be specifically described.

Now referring to FIG. 5, it will be seen that the rigid vinyl sheet 10 laminated as described in FIG. 2, first passes under a heater 38 which may have a surface temperature of eleven or twelve hundred degrees F. and which rapidly heats the material 10 to its proper forming temperature and above its heat distortion temperature. Normally the web temperatures will not exceed 300 degrees F. in being subjected to this heat. The machine then indexes the heated material to a position over the mold cavities where the draw is made by vacuum applied to the interior of the mold, thereby drawing the heated plastic sheet 10 into the mold to conform to the shape thereof. It will be noted that clips 40 grip the side margins of the web and maintain a fixed lateral dimension for the web as it moves through the machine. The machine then indexes to a cooling stage and thereafter the depressions 15 formed in the lower sheet are filled with the product to be placed in the package as indicated at the stage 39, and thereafter the top sheet 17 is applied and after evacuation the top sheet 17 is sealed to the bottom sheet 10, and the package trimmed and ejected, as at 41 in a manner well known in the industry, and as described in its essence in said Lovas patent.

In all instances it is important that the heat shrinkable material 12 have shrink energy that is released concurrently with the softening of the rigid vinyl material 11 to its workable condition so that the rigid vinyl sheet as it is held along its side margins for indexing through the machine is kept taut and free of buckling and wrinkles.

Obviously this result cannot be achieved except as the rigid vinyl is firmly bonded to the heat shrinkable material so the latter may act as a carrier or support for the rigid vinyl sheet which normally would buckle under the influence of temperatures above its thermoforming temperature.

Experience has shown that when the semi-rigid packaging machines are used for relatively deep draws, for example on the order of say one and a half inches or two inches and where heavier rigid vinyl material is used because of the deeper draw, the problem of buckling and wrinkling is amplified. When efforts had been made to use them for deep draws there have been a large percentage of failures of the hermetically sealed packages due to the imperfect seals at the flanges of the packages. However, with the present invention it has been found that this problem has been substantially eliminated.

Although the above disclosure has made specific reference to rigid vinyl material as the preferred material for use as the base ply of the formed sheet, and biaxially oriented material for the shrink material, it should be understood that other materials may be used within the scope of this invention.

For example, the base ply may be any rigid thermoformable plastic material not necessarily a clear plastic, such as rubber modified acrylic copolymer; the cellulose acetate, propionates, butyrates, etc.; polystyrene; ABS; and the like; the principal requirement being that the material is characterized by its thermo-formable properties and its tendency to buckle when subjected to the heat required for thermoforming.

Also the shrink material is preferably a biaxially oriented plastic material, and not heat set, but it is possible to use oriented materials which are unbalanced in their orientation, such as a unidirectionally oriented material.

The term "rigid plastic material" as used in the appended claims means unplasticized plastic material having a thickness of at least about 6 mils. Polyvinyl chloride without plasticizers added is an important example of materials of this type.

The term "rigid vinyl" as used herein and in the appended claims means unplasticized polyvinyl chloride having a thickness of at least about 6 mils or greater.

I claim:

1. A multi-ply thermo-formable material for use as the lower sheet in semi-rigid plastic packages comprising a base sheet of calendered rigid polyvinyl chloride material having an oriented, not heat-set, thermo-plastic material bonded thereto, with the latter material having a shrink temperature that is substantially equal to or less than the forming temperature of the rigid polyvinyl chloride material, whereby the shrink energy of the oriented material inhibits buckling of the rigid polyvinyl chloride material when said base sheet is subjected to forming temperature, said thermo-plastic material being bonded to said base sheet with an adhesive that retains its bonding effect at said forming temperature.

2. A multi-ply thermo-forming material as set forth in claim 1 in which the oriented thermo-plastic material is a vinyl.

3. A multi-ply thermo-formable material as set forth in claim 1 in which the bonded sheet is a biaxially oriented thermo-plastic material.

4. A multi-ply thermo-formable material as set forth in claim 1 in which the oriented thermo-plastic material is biaxially oriented, and in which a synthetic elastomer resin adhesive is used to bond the two materials together.

5. A multi-ply thermo-formable material as set forth in claim 1 in which the rigid polyvinyl chloride material is at least six times as thick as the oriented material bonded thereto.

6. A multi-ply thermo-formable material as set forth in claim 1 in which said adhesive is a polyvinyl acetate copolymer.

References Cited

UNITED STATES PATENTS

| | | | |
|---|---|---|---|
| 3,228,168 | 1/1966 | Grindrod et al. | 161—254 |
| 3,231,411 | 1/1966 | Tyler et al. | 161—254 |
| 3,328,196 | 6/1967 | Sincock | 161—254 |
| 3,370,972 | 2/1968 | Nagel et al. | 117—76 |
| 3,393,081 | 7/1968 | Bogle | 117—138.8 |
| 3,402,873 | 9/1968 | Lauterbach | 156—306 |
| 3,454,210 | 7/1969 | Spiegel et al. | 229—51 |
| 3,455,720 | 7/1969 | Davies et al. | 161—254 |

ROBERT F. BURNETT, Primary Examiner

G. W. MOXON II, Assistant Examiner

U.S. Cl. X.R.

53—22 A; 117—76 F; 161—166, 254, 402, 411; 206—46 F; 264—92